United States Patent
Oh

(10) Patent No.: US 8,904,461 B2
(45) Date of Patent: Dec. 2, 2014

(54) BROADCAST SIGNAL RECEIVING DEVICE AND METHOD FOR EXECUTING DATA BROADCASTING APPLICATION OF THE SAME

(75) Inventor: Keum-yong Oh, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1733 days.

(21) Appl. No.: 11/447,052

(22) Filed: Jun. 6, 2006

(65) Prior Publication Data

US 2007/0022434 A1 Jan. 25, 2007

(30) Foreign Application Priority Data

Jul. 22, 2005 (KR) ........................ 10-2005-0066863

(51) Int. Cl.
| | | |
|---|---|---|
| H04N 7/10 | (2006.01) | |
| H04N 7/16 | (2011.01) | |
| H04N 7/173 | (2011.01) | |
| H04N 21/45 | (2011.01) | |
| H04N 21/84 | (2011.01) | |
| H04N 21/81 | (2011.01) | |
| H04N 21/475 | (2011.01) | |
| H04N 21/478 | (2011.01) | |

(52) U.S. Cl.
CPC .......... *H04N 21/84* (2013.01); *H04N 21/4532* (2013.01); *H04N 21/8133* (2013.01); *H04N 21/4751* (2013.01); *H04N 21/8173* (2013.01); *H04N 21/478* (2013.01)
USPC ............. 725/109; 725/32; 725/110; 725/131; 725/135; 725/136

(58) Field of Classification Search
None
See application file for complete search history.

(56) References Cited

U.S. PATENT DOCUMENTS

| | | |
|---|---|---|
| 6,169,541 B1 * | 1/2001 | Smith ........................... 715/716 |
| 6,324,694 B1 * | 11/2001 | Watts et al. ...................... 725/32 |
| 2001/0037238 A1 * | 11/2001 | Gotoh et al. ..................... 705/14 |
| 2002/0124252 A1 | 9/2002 | Schaefer et al. |
| 2002/0194593 A1 * | 12/2002 | Tsuchida et al. ................ 725/32 |
| 2005/0086691 A1 * | 4/2005 | Dudkiewicz et al. ........... 725/44 |
| 2005/0102696 A1 * | 5/2005 | Westberg ........................ 725/46 |
| 2006/0095952 A1 * | 5/2006 | Chung ........................... 725/136 |
| 2008/0184319 A1 * | 7/2008 | Mankovitz ...................... 725/90 |

FOREIGN PATENT DOCUMENTS

| | | |
|---|---|---|
| JP | 2000-059756 A | 2/2000 |
| JP | 2002-171507 A | 6/2002 |
| JP | 2004-260447 A | 9/2004 |
| KR | 2001-0042365 A | 5/2001 |
| KR | 2001-0080427 A | 8/2001 |
| WO | WO 00/46990 A1 | 8/2000 |

\* cited by examiner

*Primary Examiner* — Nasser Goodarzi
*Assistant Examiner* — Fred Peng
(74) *Attorney, Agent, or Firm* — Sughrue Mion, PLLC

(57) ABSTRACT

A broadcast signal receiving device includes a profile management module that manages user profile information indicating whether to execute a data broadcasting application received via a channel, an application filtering module that filters data composing a data broadcasting application from data signals of broadcast signals, and an application management module that executes a data broadcasting application composed of the filtered data and according to the user profile information.

19 Claims, 8 Drawing Sheets

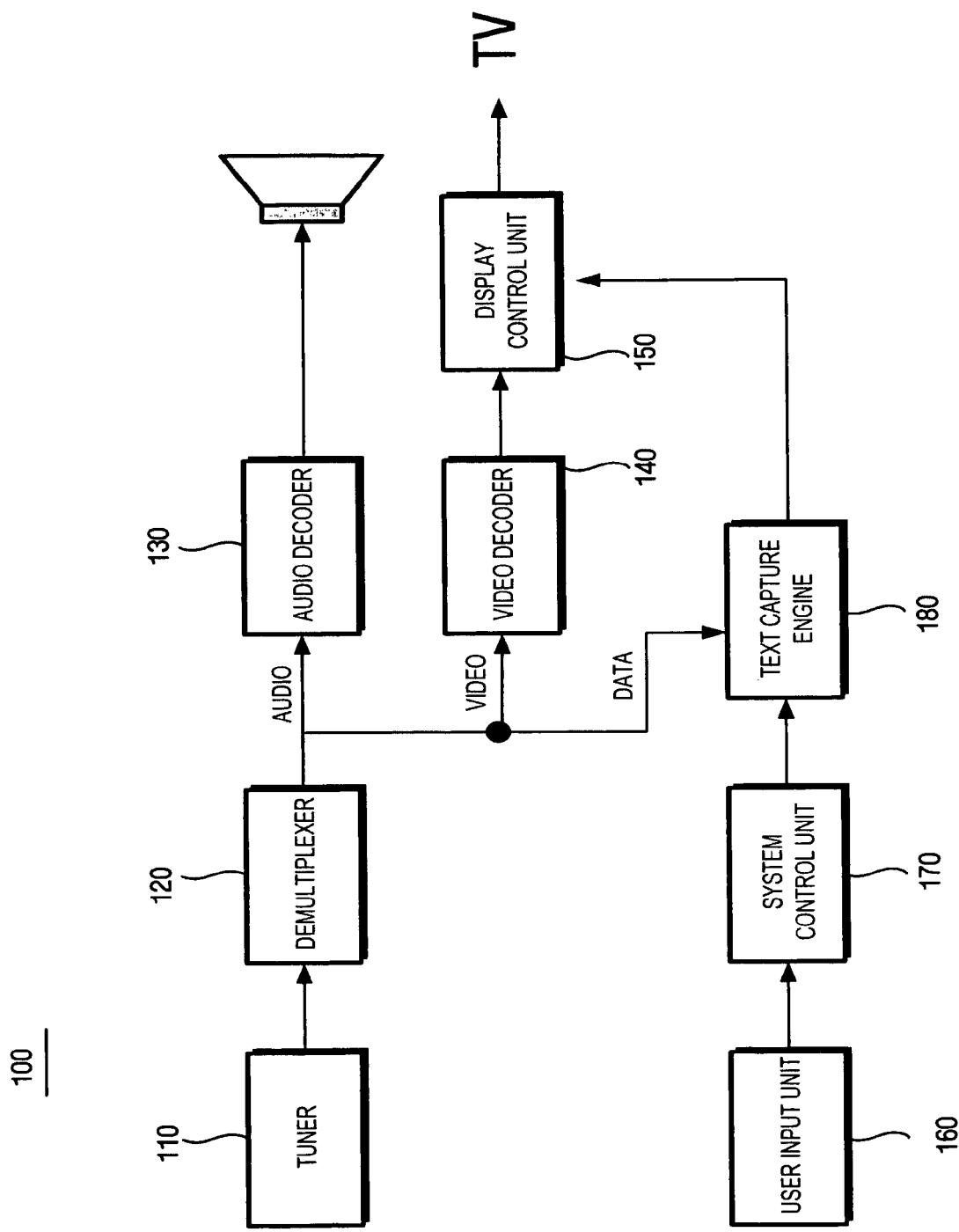

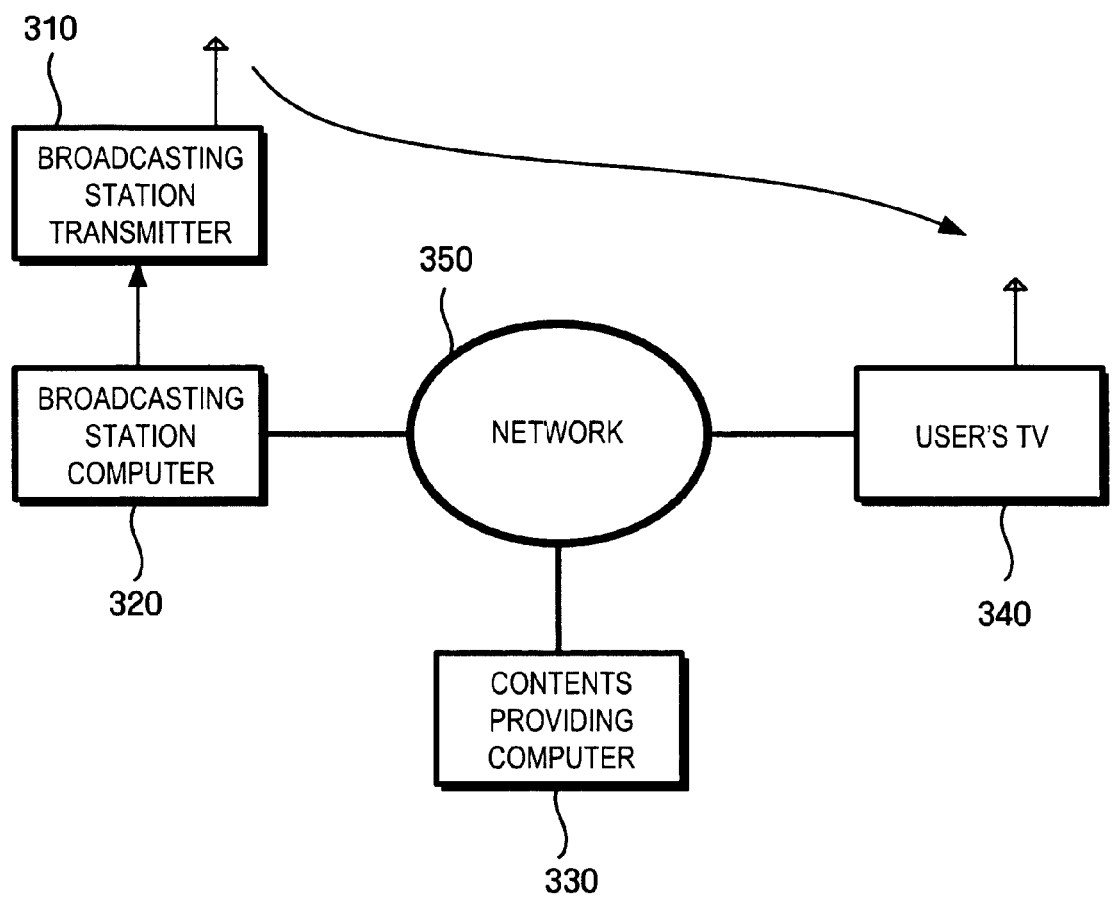

| USER PROFILE | PROFILE INFORMATION |
|---|---|
| USER PROFILE-A | PERMIT EXECUTION OF ALL DATA BROADCASTING APPLICATIONS |
| USER PROFILE-B | PERMIT EXECUTION OF UNBOUND DATA BROADCASTING APPLICATIONS |
| USER PROFILE-C | ALLOW EXECUTION OF BOUND DATA BROADCASTING APPLICATION |
| USER PROFILE-D | DISALLOW EXECUTION OF ALL DATA BROADCASTING APPLICATION |

# BROADCAST SIGNAL RECEIVING DEVICE AND METHOD FOR EXECUTING DATA BROADCASTING APPLICATION OF THE SAME

CROSS-REFERENCE TO RELATED APPLICATION

This application claims priority from Korean Patent Application No. 10-2005-0066863 filed on Jul. 22, 2005 in the Korean Intellectual Property Office, the disclosure of which is incorporated herein by reference in its entirety.

BACKGROUND OF THE INVENTION

1. Field of the Invention

Apparatuses and methods consistent with the present invention relate to data broadcasting, and more particularly, to a broadcast signal receiving device that receives data broadcasting, and a method for executing a data broadcasting application of the same.

2. Description of the Related Art

Conventional television (TV) broadcasts contain audio and video. Digital TV broadcasts, however, contain text in addition to audio and video.

Some technologies that broadcast text information have been established, and broadcast signal receiving devices, such as TV sets and set-top boxes, are commercially available.

Accordingly, broadcasting stations can transmit content such as information on weather, medicine, performances, games, books, as well as additional information on each channel or program, using hypertext mark-up language (HTML), which is the standard language of the Internet.

FIG. 1 is a block diagram showing the structure of a related art broadcast signal receiving device that may receive this text.

Referring to FIG. 1, when a digital broadcast signal of a channel, among broadcast signals received via an antenna or cable, is received via channel tuning by user, a tuner 110 tunes and demodulates the digital broadcast signal, and the obtained digital broadcast signal stream is output to a demultiplexer 120.

The demultiplexer 120 demultiplexes the input digital broadcast signal stream to thereby divide it into audio, video and text. Because the demodulated digital audio and video signals and text are multiplexed in the form of a transport packet, the demultiplexer 120 can separate them into audio and video signals and text, respectively, by demultiplexing.

The audio signal is output to an audio decoder 130 which restores the compressed audio signal to an original audio signal, and then outputs it to a speaker. Also, the video signal is output to a video decoder 140 which restores the compressed video signal to an original video signal, and then displays it via a display control unit 150.

A system control unit 170 controls a text capture engine 180 in order to capture the text and output the captured text to the display control unit 150. The text is a data stream format consisting of a header and a payload. As an example, the header includes information to signify start of signals, a packet identification number to identify information included in the payload following it. After data is extracted from the payload, fragments of the data are combined to constitute a single file, which is in a specific format.

The display control unit 150 displays on the screen the text-based content transmitted from the text capture engine 180 along with a video signal output via the video decoder 140. The system control unit 170 controls the data flow between the demultiplexer 120 and the text capture engine 180.

The user input 160 denoted by numeral 160 in FIG. 1 implies that a predetermined data broadcasting application is executed when a user selects it using a remote control.

The data broadcasting application received by the broadcast signal receiving device is displayed on a TV screen in one of two possible ways.

In the first way, when a data broadcast is received, a data broadcasting application for the data broadcast is automatically displayed on a screen, regardless of whether the user selects it. In the other way, when a data broadcast is received, the user is given an opportunity to select an application for viewing the data broadcasting, and the application is displayed only when the user selects it.

Displaying of the data broadcast using the latter case is illustrated in FIGS. 2a and 2b.

Several data broadcasting applications for one channel may be transmitted according to the current text broadcasting specification, and a user can select one of them to view.

As the user views the audio/video (A/V) broadcasts of a predetermined channel, data broadcasts corresponding to the channel are received by the broadcast signal receiving device. When the data broadcasts are completely received, they can be displayed on the current A/V broadcasting screen, as illustrated in FIGS. 2A and 2B.

Referring to FIG. 2A, a mark A 210 is displayed in the top left of the screen 200. If a user wants to view various data broadcasting applications corresponding to the received data broadcasts, the user makes the mark A 210 active using a remote control.

FIG. 2B shows an exemplary screen displayed when the user makes the mark A 210 active. In order for the user to select a data broadcasting application, a list 220 of data broadcasting applications is displayed on the screen (FIG. 2B). Then, the user may select and view the data broadcasting application by manipulating a direction key of the remote control.

With development in communication technologies and content industries, it is expected that a number of data broadcasting applications will be transmitted to broadcast signal receiving devices such as TV sets or set-top boxes. Here, automatic display of data broadcasting applications, regardless of the user's preference, is liable to cause inconvenience to the user.

If a number of data broadcasting applications associated with an advertisement are continuously displayed on a screen while a user is watching TV program, the user may become annoyed and cease viewing.

Accordingly, it is necessary to provide a device and method that allows the user to control the execution of data broadcasting applications received for each channel.

SUMMARY OF THE INVENTION

The present invention provides a broadcast signal receiving device that controls data broadcasting applications according to execution information of the data broadcasting applications preset by a user, and a method of the broadcast signal receiving device for executing the data broadcasting applications.

According to an aspect of the present invention, there is provided a broadcast signal receiving device including a profile management module to manage user profile information showing whether to execute a text broadcasting application received via a channel, an application filtering module to filter data that composes a text broadcasting application from a broadcast signal, and an application management module to execute a text broadcasting application composed of the filtered data and according to the user profile information.

According to another aspect of the present invention, there is provided a method of the broadcast signal receiving device for executing a text broadcasting application including filtering data that composes a text broadcasting application from a broadcast signal, extracting user profile information showing whether to execute the text broadcasting application, and executing a text broadcasting application composed of the filtered data and according to the extracted user profile information.

BRIEF DESCRIPTION OF THE DRAWINGS

The above and other aspects of the present invention will become more apparent by describing in detail exemplary embodiments thereof with reference to the attached drawings in which:

FIG. 1 is a block diagram showing the structure of a conventional broadcast signal receiving device;

FIG. 3 is a schematic diagram illustrating the structure of a data broadcasting system according to an exemplary embodiment of the present invention;

DETAILED DESCRIPTION OF EXEMPLARY EMBODIMENTS THE INVENTION

Figure 2A:
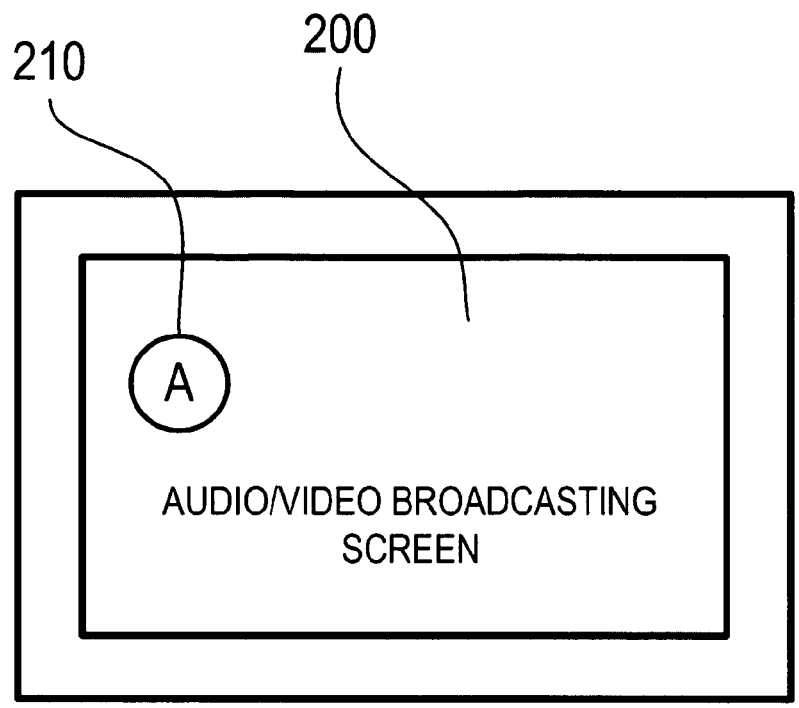
FIGS. 2A and 2B illustrate screens on which a data broadcasting application executed via the conventional broadcast signal receiving device is displayed.
Figure 2B:
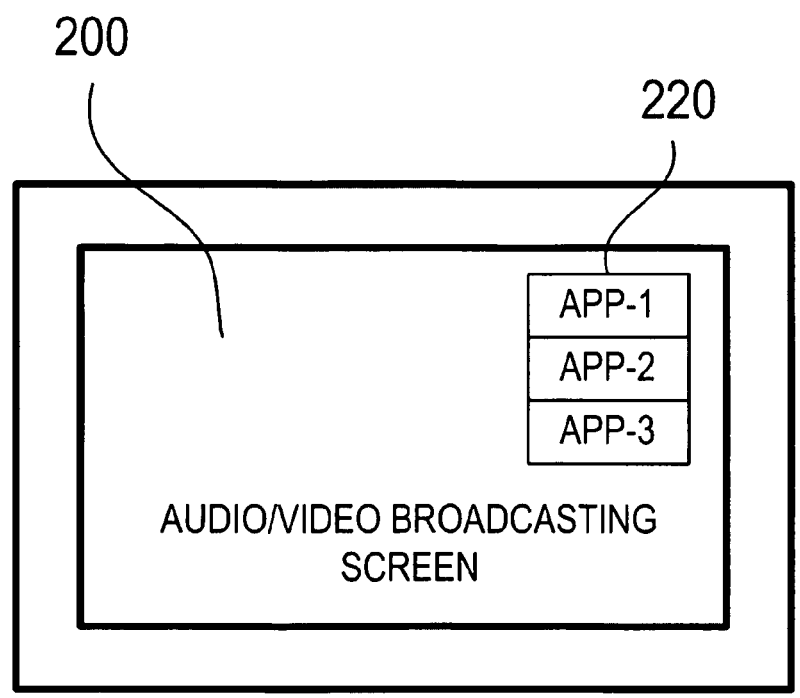

Advantages and features of the present invention and methods of accomplishing the same may be understood more readily by reference to the following detailed description of the exemplary embodiments and the accompanying drawings. The present invention may, however, be embodied in many different forms and should not be construed as being limited to the exemplary embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of user interfaces, methods, and computer program products according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the functions specified in the flowchart block or blocks. The computer program instructions may also be loaded into a computer or other programmable data processing apparatus to cause a series of operational steps to be executed in the computer or other programmable apparatus to produce a computer implemented process such that the instructions that execute in the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order, depending upon the functionality involved.

A broadcast-signal-receiving device includes a device that provides user audio, video and text extracted from a broadcasts signal after receiving broadcasts signals via terrestrial wave, satellite or cable.

FIG. 3 is a schematic diagram illustrating the structure of a text broadcasting system according to an exemplary embodiment of the present invention.

Referring to FIG. 3, a data broadcasting system 300 according to the present invention includes a network 350, a broadcasting station's transmitter 310, a broadcasting station's computer 320, a content server 330 and a user's TV 340. Here the content is text and a data broadcasting application.

The network 350 may be the Internet. Because software and hardware for connecting to the Internet are built in to the broadcasting station's computer 320, and the content provider's computer 330 and the user's TV 340 are connected to the network 350, two-way communication is possible.

The broadcasting station transmitter station 310 adds text to the content produced by a broadcasting station, advertisements, and content developed by a provider who manages online commerce for program content, and then transmits them.

The broadcasting station's computer 320 classifies additional information using a database, and then stores it. Hardware and software that manage data transmitted from a user via the network 350 are built in to the broadcasting station's computer 320.

The content provider's computer 330 produces advertisements that will be added to broadcast programs under a contract with a broadcasting station, and content associated with on-line commerce, and sends them to the broadcasting station. Hardware and software that manage online commerce information transmitted via the network 350 are built in to the content provider's computer 330.

The user's TV 340 has built-in hardware and software that extracts text from broadcast signals transmitted by the broadcasting station's transmitter 310, and manages it. Also, the user's TV 340 has built-in hardware and software to transceive information on the text by connecting with the broadcasting station's computer 320 and the content provider's computer 330 via the network 350.

Viewers may select and use text in the broadcasting program transmitted by the broadcasting station's transmitter 310. The broadcast-signal-receiving device using text obtained from the user's TV will be described in detail in the following.

Figure 4:
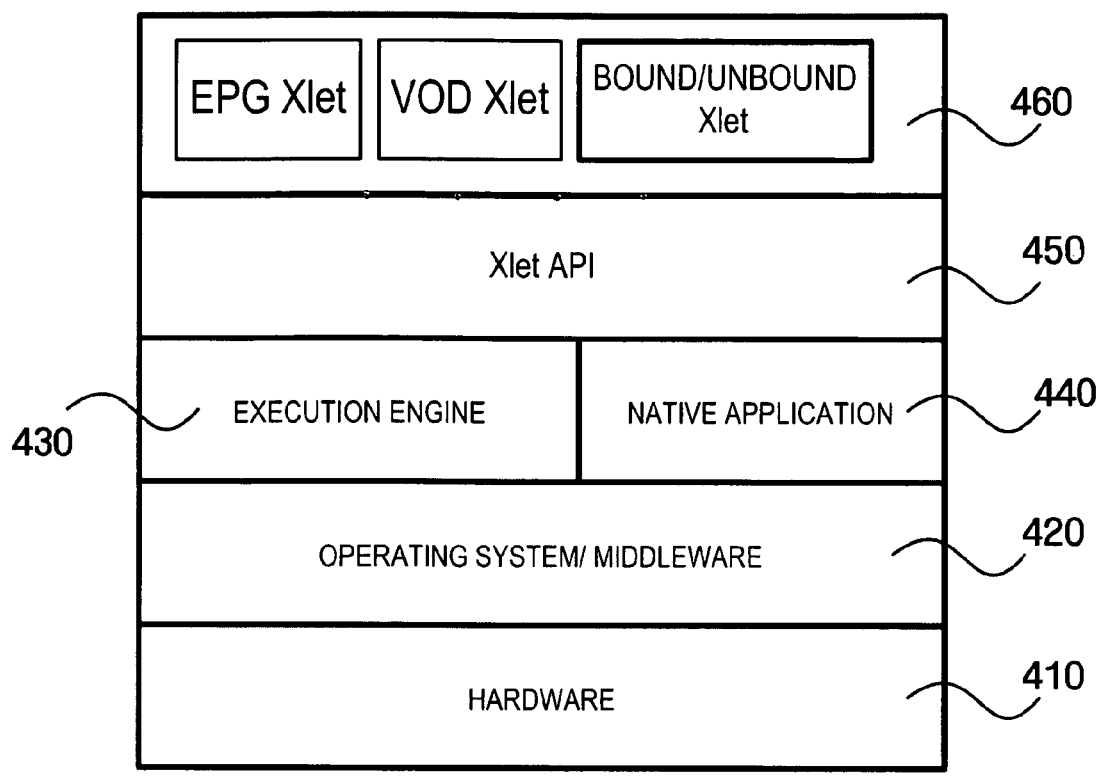
FIG. 4 illustrates the protocol stack structure of a broadcast signal receiving device according to an exemplary embodiment of the present invention.

FIG. 4 illustrates the protocol stack structure of a broadcast-signal-receiving device according to an exemplary embodiment of the present invention.

The broadcast-signal-receiving device comprises hardware 410, an operating system (OS) to control the hardware, and middleware 420.

An execution engine 430 able to execute a data-broadcasting application and a native application 440 are operated based on the operating system and the middleware 420. The native application 440 is an application loaded when the broadcast-signal-receiving device is produced or upgraded; for example, an electronic program guide (EPG), which is loaded when a user purchases the broadcast-signal-receiving device and applications with various menus.

Also, various data-broadcasting applications 460 may be executed via an Xlet application programming interface (API) 450. The Xlet API 450 may be defined by standards such as the Digital Video Broadcast Multimedia Home Platform (DVB-MHP), the Open Cable Application Platform (OCAP), and the Advanced Common Application Platform (ACAP).

The data-broadcasting applications 460 comprise Xlet applications, such as an electronic program guide (EPG) or video on demand (VOD) and a bound or unbound Xlet application. The bound application is bound to services (or channels) or programs. For example, the bound application automatically disappears when changing to another channel because the bound application is bound to a specific channel, or after ending specific broadcasting because the bound application is bound to specific broadcasting (e.g., TV drama or news).

The unbound application refers to a service (channel) unbound application and a program unbound application.

If a broadcasting station A operates an A-1 channel and an A-2 channel, the service (channel) unbound application shows all the programs of broadcasting station A.

If a specific broadcasting station operates only one channel, the program unbound application refers to provided applications (e.g., a weather application and a news application), regardless of programs.

Figure 5:
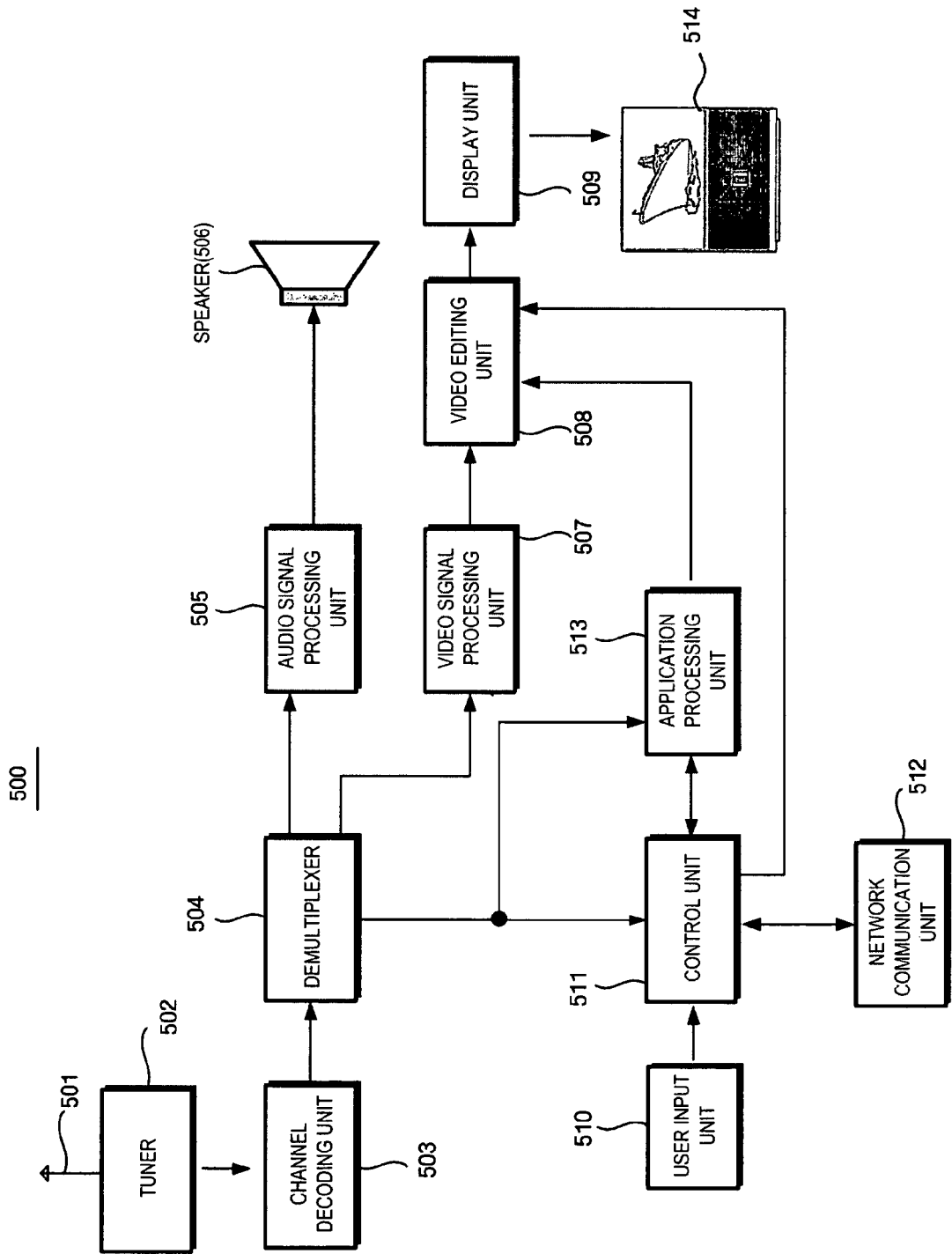
FIG. 5 is a block diagram showing the structure of a broadcast signal receiving device according to an exemplary embodiment of the present invention.

FIG. 5 is a block diagram showing the structure of a broadcast-signal receiving device according to an exemplary embodiment of the present invention.

Referring to FIG. 5, a broadcast-signal receiving device 500 may include an antenna 501, a tuner 502, a channel-decoding unit 503, a demultiplexer 504, an audio signal processing unit 505, a speaker 506, a video signal processing unit 507, a video editing unit 508, a display unit 509, a user-input unit 510, a control unit 511, a network communication unit 512, and an application processing unit 513.

When a user selects a desired broadcast channel after turning on the TV using key input means of the user-input unit 510, the tuner 502 outputs only the broadcast signal of the channel set by the user among broadcast signals received via the antenna or input terminal (not shown). The user input unit 510 may be a remote control.

Then, the channel-decoding unit 503 separates the digital signal found in broadcast signal of the selected channel by packet, and then outputs it to the demultiplexer 504. The demultiplexer 504 classifies the audio, video and data signals extracted from the signal independent series of bits, and then outputs them.

The separated audio signal is output to the speaker 506 after demodulation and error correction is performed by the audio signal processing unit 505.

The separated video signal is output to the video editing unit 508 after demodulation and error correction is performed by the video-signal processing unit 507. Data and a data broadcasting application are input to the video-editing unit 508 after the separated data signals are processed.

The video-editing unit 508 edits information, received from the video-signal processing unit 507 and the application processing unit 513, and composes one screen showing the information in order to send the screen to the displaying unit 509.

The displaying unit 509 outputs the screen composed by the video editing unit 508 to a display unit such as a TV 514.

The control unit 511 allows the application processing unit 513 to execute a user interface that a user may set via the user input unit. Then the application processing unit 513 displays the user interface to the TV 514 via the video-editing unit 508 and the displaying unit 509. The information on whether to execute a data broadcasting application received will be referred to as a "user profile".

Figures 6, 7:
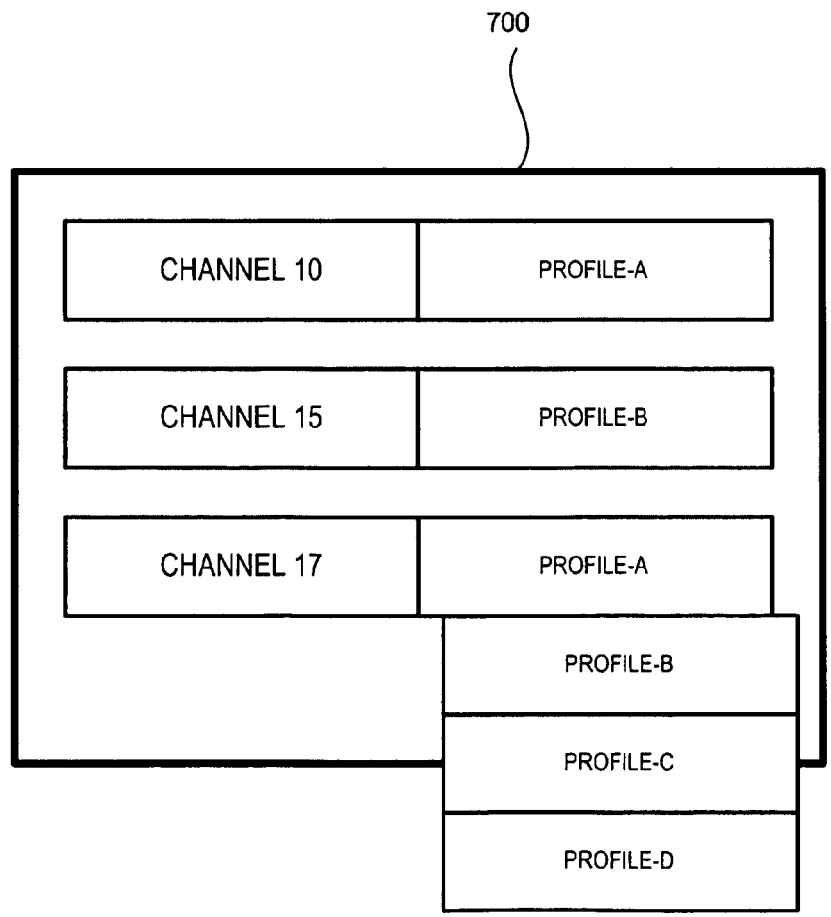
FIG. 6 illustrates a user profile according to an exemplary embodiment of the present invention.
FIG. 7 illustrates a user interface to set the user profile according to an exemplary embodiment of the present invention.

FIG. 6 illustrates a user profile according to an exemplary embodiment of the present invention. A user profile A includes information that permits execution of all the received data broadcasting applications. A user profile B includes information that permits execution of an unbound data-broadcasting application among received data broadcasting applications. A user profile C includes information that permits execution of a bound data-broadcasting application of received data broadcasting applications. A user profile D includes information that prevents execution of all received data broadcasting applications.

FIG. 7 illustrates a user interface to set the user profile illustrated in FIG. 6 according to an exemplary embodiment of the present invention.

Referring to FIG. 7, shaded parts show the user profile information selected by a user.

The user profile A in FIG. 6 is set to channel 10. If a user selects channel 10, all received data broadcasting applications can be executed. The user profile B in FIG. 6 is set to channel 15. If the user selects channel 15, an unbound data-broadcasting application of received data broadcasting applications can be executed.

A menu that allows a user to select a user profile is activated in channel 17, and a user may select a desired profile among four profiles using a direction button of the user-input unit 510.

If channel 15 is selected by the user, the control unit 511 allows the application processing unit 513 to execute only an unbound broadcasting application among broadcasting applications received from channel 15. Accordingly, the video editing unit 508 receives the text provided by the unbound broadcasting application and edits it with information received from the video-signal processing unit 507.

User profile information in FIG. 6 and the user interface in FIG. 7 may be managed by the application processing unit 513.

The network-communication unit 512 has built-in network-communication software and hardware, and may produce a return channel synchronized with the data broadcasting applications.

Figure 8:
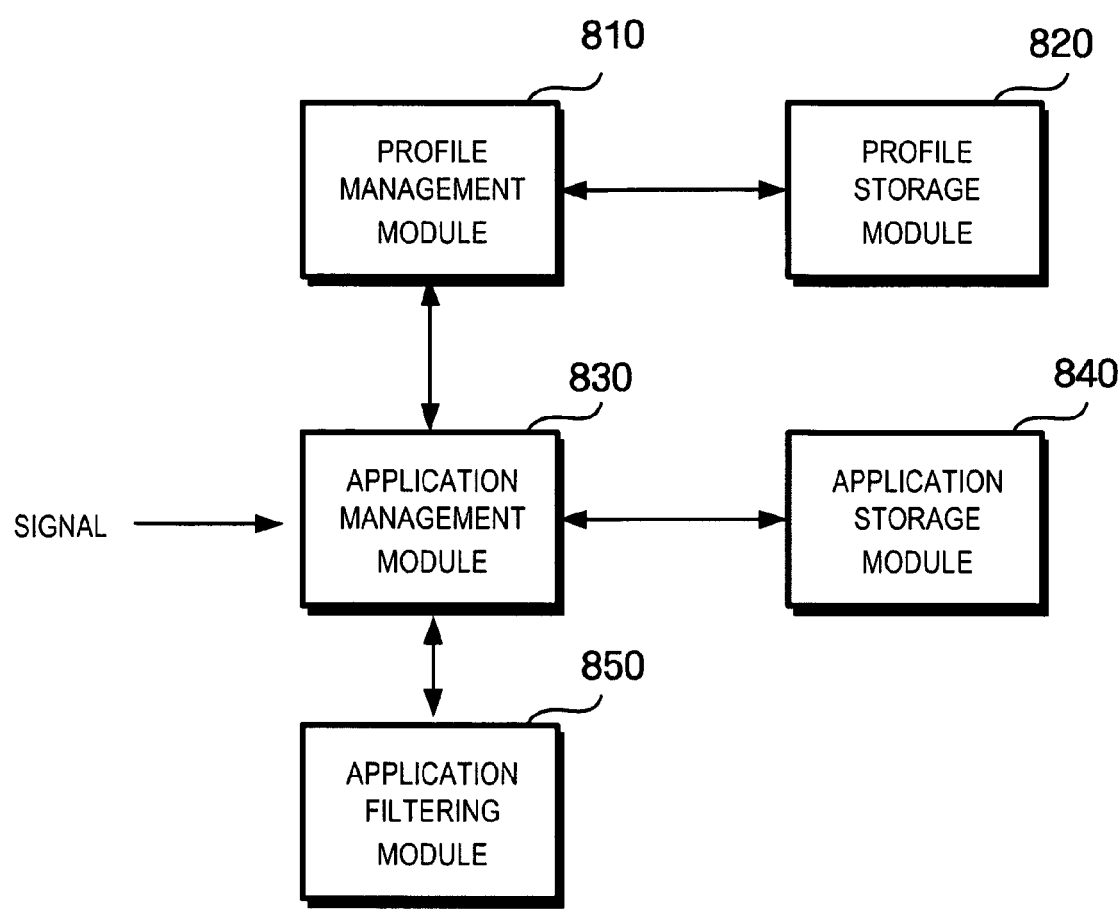
FIG. 8 is a block diagram showing an application processing unit according to an exemplary embodiment of the present invention.

FIG. 8 is a block diagram showing an application processing unit according to an exemplary embodiment of the present invention. The application processing unit comprises a profile-management module 810, a profile storage module 820, an application-management module 830, an application storage module 840 and an application-filtering module 850.

Information on the user profile in FIG. 6 is stored in the profile storage module 820.

The profile-management module 810 provides the user interface in FIG. 7 according to a user's request and stores the result in the profile storage module 820. The profile management module 810 also extracts a user profile from the profile storage module 820 according to a request of the application management module 830 and provides it to the application module 830.

The application filtering module 850 filters data that composes a data broadcasting application and stores the result in the profile storage module 820. The application management module 830 stores data filtered by the application filtering module 850 in the application storage module 840.

Various data broadcasting applications received from the channel selected by a user are stored in the application storage module 840.

The application management module 830 executes the data broadcasting application stored in the application storage module 840 by requesting user-profile information from the profile management module 810, and applying the user profile.

The term "module", as used herein, means, but is not limited to, a software or hardware component, such as a Field Programmable Gate Array (FPGA) or Application Specific Integrated Circuit (ASIC), which executes certain tasks. A module may advantageously be configured to reside in the addressable storage medium, and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Each module may be executed by the execution engine 430 illustrated in FIG. 4.

Figure 9:
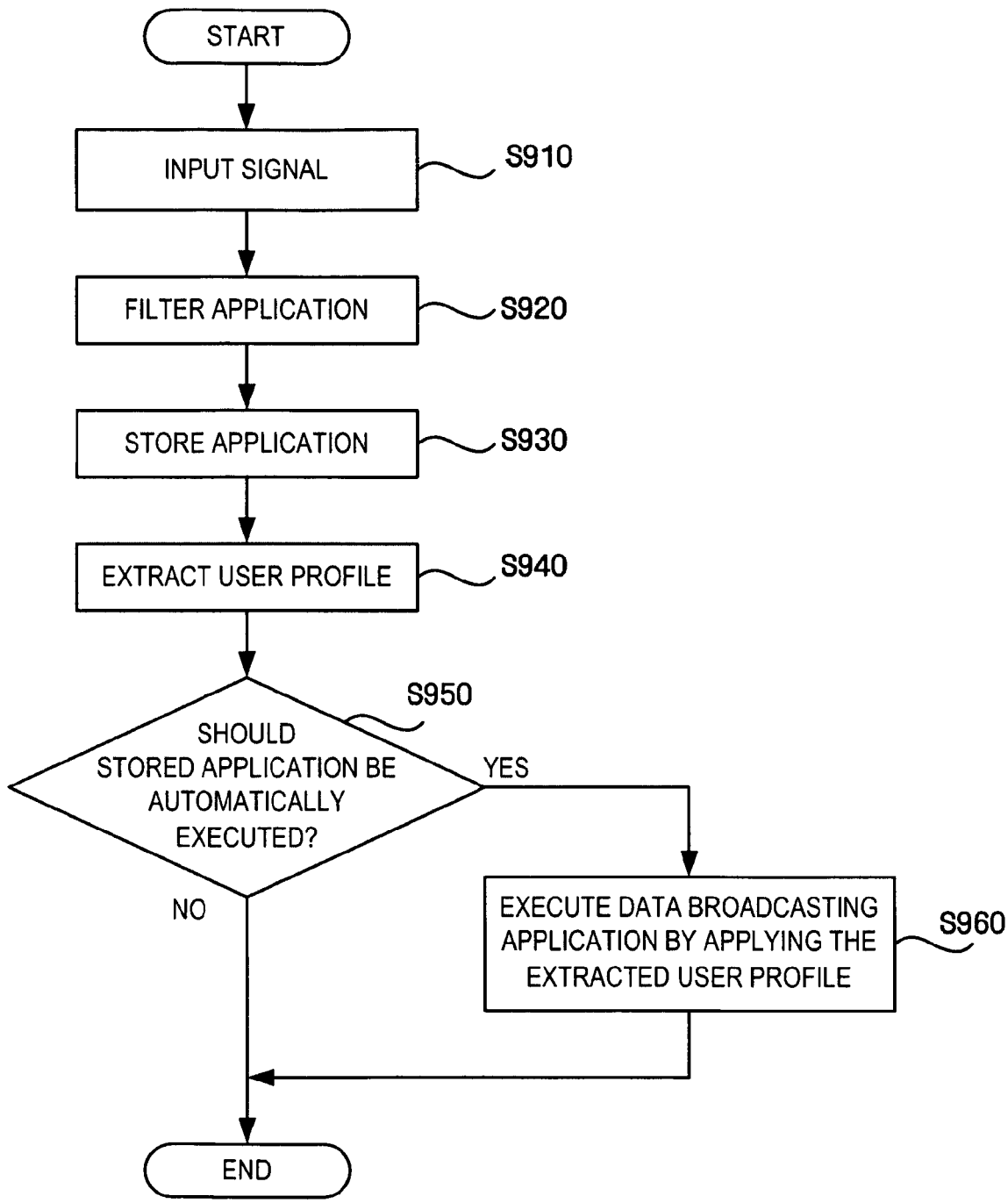
FIG. 9 is a flowchart of a method to execute a text broadcasting application according to an exemplary embodiment of the present invention.

Interactions between modules will be described by using the flowchart of FIG. 9.

When the control unit 511 receives an application information table (AIT) that includes numeral and functional information of the application program, application control codes, and the application program's name and position from the demultiplexer 504, which sent to the application management module 830 of the application processing unit 513 (S910). The above is referred to as a "signal".

If the application management module 830 receives the signal, the application management module 830 allows the application-filtering module 850 to filter data that composes a data broadcasting application (S920).

In S930, the application management module 830 stores the data filtered by the application-filtering module 850 in the application storage module 840. That is, various data broadcasting applications being received from channel are stored in the application storage module 840.

If the application management module 830 requests a user profile from the profile management module 810, the profile management module 810 extracts the user profile from the profile storage module 820, and provides it to the application management module 830 (S940).

The application management module 830 tests whether a data broadcasting application stored in the application storage module 840 is an application that has an auto-executing attribute (S950). If the application has an auto-executing attribute, the application management module 830 determines whether to execute the application using a user profile provided from the profile management module 810 (S960).

Also, a user may correct the user profile while the data broadcasting application is being executed.

In this case, the application management module 830 determines whether to execute the application using the new user profile provided from the profile management module 810.

According to the broadcast signal receiving device and the method for executing data broadcasting application using the broadcast signal receiving device, a user can control the data-broadcasting applications that are auto-executed by defining a user profile about executing data-broadcasting applications, and applying the user profile.

Although the apparatus and method for managing a file system according to the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects.

What is claimed is:

1. A broadcast signal receiving device comprising:
a profile management module configured to manage user profile information that indicates whether execution of data broadcasting applications for a first channel to be displayed by the broadcast signal receiving device is permitted and whether execution of data broadcasting applications for a second channel to be displayed by the broadcast receiving device is permitted;
an application filtering module configured to filter a data broadcasting application from a broadcast signal of a selected channel comprising the data broadcasting application, an audio signal of the selected channel, and a video signal of the selected channel, wherein selected channel is one of the first channel and the second channel; and
an application management module determine whether the user profile information indicates for the selected channel that the execution of data broadcasting applications is permitted, control the broadcast signal receiving device to display the selected channel and execute the data broadcasting application in response to determining the user profile information indicates that execution of data broadcasting applications for the selected channel is permitted, and control the broadcast signal receiving device to display the selected channel and inhibit execution of the data broadcasting application in response to determining the user profile information indicates that execution of data broadcasting applications for the selected channel is not permitted.

2. The device of claim 1, wherein the data broadcasting application is automatically executed.

3. The device of claim 1, wherein if the user profile information is changed, the application management module controls execution of the data broadcasting application according to changes in the user profile information.

4. The device of claim 1, wherein the profile management module is further configured to provide a user interface through which a user may set the user profile information.

5. The device of claim 1, wherein the broadcast signal includes an application information table that describes the data broadcasting application.

6. The device of claim 1, wherein the application management module is further configured to control a storage unit to the user profile information.

7. The device of claim 1, further comprising a storage module configured to store the data broadcasting applications.

8. The device of claim 1, wherein the user profile information comprises execution information on the data broadcasting applications bound by at least one of the first channel, the second channel, or a broadcasting program.

9. The device of claim 1, wherein the user profile information comprises information on executing the data broadcasting applications that are not bound by at least one of the first channel, the second channel, or a broadcasting program.

10. A method of executing a data broadcasting application, the method comprising:
   filtering a data broadcasting application from a broadcast signal, the broadcast signal comprising the data broadcasting application, an audio signal of a selected channel, and a video signal of the selected channel, wherein the selected channel is one of a first channel and a second channel;
   extracting information that indicates whether execution of the data broadcasting application for the selected channel is permitted from user profile information that indicates whether execution of data broadcasting applications for the first channel to be displayed by a broadcast signal receiving device is permitted and whether execution of data broadcasting applications for the second channel to be displayed by the broadcast receiving device is permitted;
   determining whether the extracted information indicates that execution of data broadcasting applications for the selected channel is permitted; and
   displaying the selected channel and executing the data broadcasting application in response to determining the extracted information indicates that execution of data broadcasting applications for the selected channel is permitted, and displaying the selected channel and inhibiting execution of the data broadcasting application in response to determining the extracted information indicates that execution of data broadcasting applications for the selected channel is not permitted.

11. The method of claim 10, wherein the executing the data broadcasting application comprises automatically executing the data broadcasting application.

12. The method of claim 10, further comprising if the user profile information is changed, executing the data broadcasting application according to the changed user profile.

13. The method of claim 10, further comprising providing a user interface through which a user may set the user profile information.

14. The method of claim 13, further comprising storing the user profile information input via the user interface.

15. The method of claim 10, wherein the broadcast signal includes an application information table that describes the data broadcasting application.

16. The method of claim 10, further comprising storing the data broadcasting application.

17. The method of claim 10, wherein the user profile information comprises execution information on the data broadcasting applications bound by at least one of the first channel, the second channel, or a broadcasting program.

18. The method of claim 10, wherein the user profile information comprises execution information on the data broadcasting applications that are not bound by at least one of the first channel, the second channel, or a broadcasting program.

19. A broadcast signal receiving device comprising:
   a tuner configured to tune to a selected channel of a received broadcast signal, the selected channel comprising a video signal, an audio signal, and a data signal, wherein the selected channel is one of a first channel and a second channel;
   a demultiplexer configured to demultiplex the data signal from among the video signal, the audio signal, and the data signal of the tuned selected channel, the demultiplexed data signal comprising a data broadcasting application of the selected channel;
   a storage unit figured to store a user profile information that indicates whether execution of data broadcasting applications for the first channel is permitted and whether execution of data broadcasting applications for the second channel is permitted;
   a processor configured to determine whether the user profile information indicates for the selected channel that the execution of data broadcasting applications is permitted, control the broadcast signal receiving device to display the selected channel and execute the data broadcasting application based on the user profile in response to determining the user profile information indicates that the execution of data broadcasting applications for the selected channel is permitted, and control the broadcast signal receiving device to display the selected channel and inhibit execution of the data broadcasting application in response to determining the user profile information indicates that the execution of data broadcasting applications for the selected channel is not permitted; and
   a display configured to display the selected channel and the data broadcasting application.

* * * * *